United States Patent [19]

Chang

[11] Patent Number: 5,063,376

[45] Date of Patent: Nov. 5, 1991

[54] NUMERIC MOUSE ONE HAND CONTROLLABLE COMPUTER PERIPHERAL POINTING DEVICE

[76] Inventor: Ronald G. Chang, 1124 Wonderlich Dr., San Jose, Calif. 95129

[21] Appl. No.: 348,062

[22] Filed: May 5, 1989

[51] Int. Cl.⁵ .............................................. G09G 5/00
[52] U.S. Cl. .................................. 340/706; 340/707; 340/710; 340/711; 341/34
[58] Field of Search ............... 340/710, 706, 707, 709, 340/711, 712; 400/486, 489; 200/5 R; 364/709.01, 709.12, 709.13, 709.14, 709.15; 341/21, 22, 34; 178/18, 19, 20

[56] References Cited

U.S. PATENT DOCUMENTS

| | | | |
|---|---|---|---|
| 4,296,406 | 10/1981 | Pearson | 341/34 |
| 4,313,113 | 1/1982 | Thornburg | 178/18 |
| 4,318,096 | 3/1982 | Thornburg et al. | 340/710 |
| 4,369,439 | 1/1983 | Broos | 340/710 |
| 4,650,934 | 3/1987 | Burke | 200/5 R |
| 4,835,528 | 5/1989 | Flinchbaugh | 340/710 |
| 4,961,138 | 10/1990 | Gorniak | 340/710 |

FOREIGN PATENT DOCUMENTS

| | | | |
|---|---|---|---|
| 59-90136 | 5/1984 | Japan | 341/22 |
| 0139437 | 10/1984 | Japan | 340/710 |
| 2161755A | 1/1986 | United Kingdom | 340/710 |

OTHER PUBLICATIONS

Rosch, Winn L., "Digitizing Tablets, Pointing the Way to Easier Input", PC Magazine, Nov. 28, 1989, pp. 227–281.

IBM Technical Disclosure Bulletin, "Mouse/Keyboard Concept Incorporating Unique Devices for Controlling CRT Display Cursors", vol. 27, No. 10B, Mar. 1985, pp. 6299–6305.

Primary Examiner—Alvin E. Oberley
Assistant Examiner—Richard Hjerpe
Attorney, Agent, or Firm—The Dulin Law Firm

[57] ABSTRACT

A hand controlled peripheral pointing device having an optional analog switch to permit the user to dynamically and continuously change the value of an attribute, for example, the width of a line or color saturation value, when the device is moved. Activation of the analog button or key permits the user to change an attribute value of graphical data input as desired depending on the depth of depression of the key. In the preferred embodiment, the device is a mouse having a numeric keypad placed thereon. This numeric key pad allows the user to directly enter data without moving the hand back and forth between the mouse and a computer key board. The numeric mouse is able to operate in two modes, including a conventional point and click mode and an analog mode. An alternate embodiment comprises a light pen having a finger actuated analog button disposed adjacent the writing tip of the pen. One manner of switching between modes (analog to click and vice versa) is program driven, i.e. depending on what item the mouse or light pen is pointing to, the activation of the key varies an attribute value or functions in the conventional "click" or keystroke manner.

27 Claims, 1 Drawing Sheet

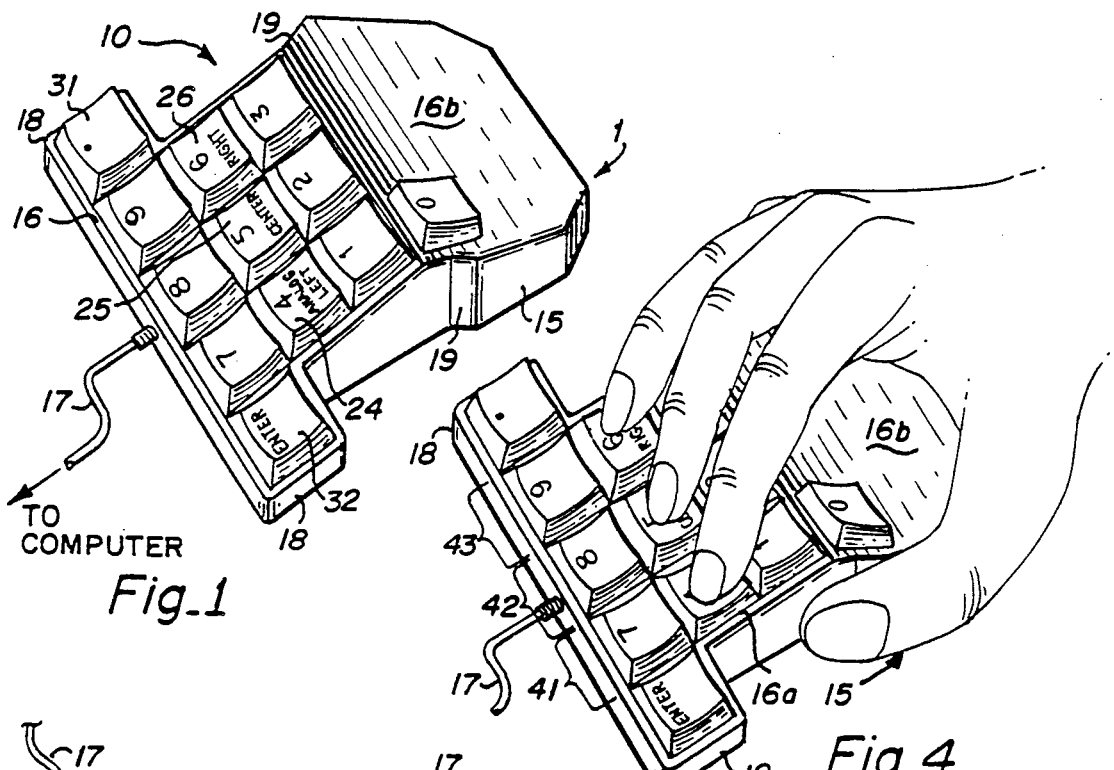
Fig_1
Fig_4
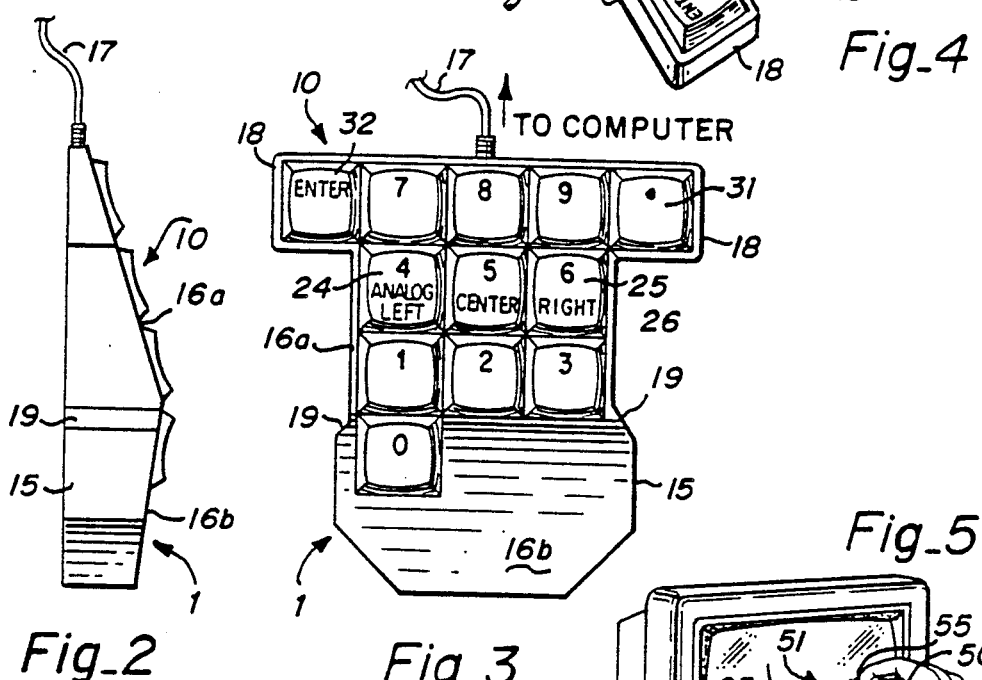
Fig_2
Fig_3
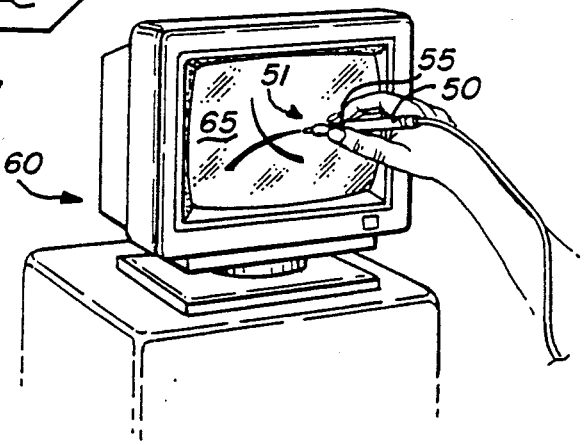
Fig_5

NUMERIC MOUSE ONE HAND CONTROLLABLE COMPUTER PERIPHERAL POINTING DEVICE

FIELD

The invention relates in its broadest aspects to a new computer input device, namely a hand held controllable computer peripheral pointing device which I call a "Numeric Mouse", which makes some type of information input to a computer much easier than before. More particularly, the invention relates to a hand held computer peripheral pointing device having at least one depth-position sensitive button (key) thereon, wherein the user is able to control the value of the input data in relation to the depth the button is depressed. In a principal embodiment, the hand controlled computer peripheral pointing device is a mouse and has a plurality of numeric keys for inputting digital information, which need not have but may optionally include the analog switch key. In a second principal embodiment, the pointing device is a light pen with an analog button disposal thereon.

BACKGROUND

Hand controlled computer peripheral pointing devices are very popular among users of graphics computer application programs, such as CAD applications and paint programs. These pointing devices may take the form of digitizers, pressure pens, light pens, or a mouse, and may require a special tablet or writing surface. People now use a computer mouse to paint a picture. For most graphic input to a computer they use it as a pen to draw a line, or as a brush to paint a picture.

The mouse, being the most common pointing device, is very popular because of its capability of being a relative positioning device, as opposed to an absolute positioning device, such as a light pen, pressure pen or digitizer. Thus, a mouse can be used on any flat surface, such as a desk top, since the special tablet associated with absolute positioning devices is not required.

However, the mouse, despite its simplicity and wide acceptance among computer pointing device users, is still limited in its ability to permit the user to draw or paint as in real life sketching or painting. That is, it is not able to vary line or brush stroke width, color or intensity.

For example, to begin drawing or painting with a mouse, the user presses a digital button on the computer mouse to simulate contact between the pen or brush and the paper (or canvas), after which the computer mouse is moved across a flat surface to simulate the movement of the pen (or paint brush). Since the digital button on the mouse can only represent two states, i.e. either a contact or non-contact state, the user is limited to the intensity of the line that he or she may draw or paint. That is, they cannot change the width, color or intensity of a line during mouse movement as they can during a free hand drawing or sketch.

A computer mouse is also used as a point and click device, wherein the mouse is moved by the user across a flat work surface, thus moving the cursor on the screen to a particular location or to a particular item. People use the computer mouse to point to an item on the computer screen and then click the button to enter that particular location or select that particular item. This interface technique provides a convenient way for the user to select options on the computer screen, such as in pull-down menu applications, and hence has been widely accepted since it is very convenient for the user. But when commands are selected in this point and click way, the user's hand must hold the mouse; hence it is taken away from the computer keyboard. Thus problems occur when a computer mouse pointing device is used to select a position on the computer screen and a command must also be given to effect a desired result in the applications program. The user must then move his/her hand back to the keyboard and press the requested function key, thus negativing the convenience aspect of the mouse.

Additionally, the computer applications program may require that the user to key in numeric data since the computer can not display all of the integers. When this situation happens, the user must move his hand back to the keyboard to key in the requested or required data after which he moves his hand back to the computer mouse in order to use the point and click technique again. This results in a lot of time wasted and the potential for additional time spent on correcting mistakes during the busy and confused movement of the user's hand between the mouse and the keyboard.

Thus, there is a need in the art for an improved hand-controlled computer peripheral pointing device which gives the user the ability to better simulate free hand drawing or painting on a computer screen.

There is also a need in the art for a hand controlled computer peripheral pointing device having the capability of entering digital information directly from the pointing device and thus obviating the need to return back to the keyboard for inputting these values.

THE INVENTION

OBJECTS

Several objects and advantages of the present invention include:
(a) to provide a way to dynamically control the value of some attribute, for example, the width of a line, when the pointing device (mouse) is moved;
(b) to provide a way to specify a value, which has more than two possible states, by just moving one finger; for example, the computer can continuously keep changing the color saturation according to the depth of an analog switch which is pressed by one finger so that when the user is satisfied with that color, he just clicks another digital key;
(c) to avoid moving the hand back and forth, which greatly reduces the advantage of using the point and click technique to interface with computer;
(d) to provide a way to point the mouse to the data box and then key in numeric data, which point and type technique greatly reduces trouble when the user doesn't know the correct key needed to be typed to move the cursor to the next box;
(e) to free the hand when the user needs to type in a lot of numeric data whereby the user can move his hand to whichever position (location on his desktop) he feels most comfortable as long as the mouse is in his hand, the mouse being much easier to move than the computer keyboard;

It is another object of the invention to provide a hand controlled computer peripheral pointing device having means for controlling the value of input data so that free hand drawing, sketching or painting in graphics programs can be simulated on the computer screen;

It is another object of the invention to provide a hand controlled computer peripheral pointing device having at least one depth-sensitive button disposed thereon for controlling the value given to the desired attribute of the data to be inputted by depression of the button;

It is another object of the invention to provide a numeric mouse having a plurality of buttons disposed thereon for conveniently inputting numerical data to the computer system;

It is another object of the invention to provide a one-hand, hand held computer peripheral pointing and inputting device having a plurality of ergonomically positioned buttons at least one of which is analog for dynamically and continuously controlling the value in relation to the amount (depth) by which the button is depressed; and Still other objects will be evident from the summary, drawings and detailed specification which follows.

DRAWINGS

FIG. 1 is a perspective view showing the shape of the principal numeric mouse embodiment of the invention, FIG. 2 is a left side elevation view of the Numeric Mouse of FIG. 1.

FIG. 3 shows the top plan view of FIG. 1.

FIG. 4 is a perspective view showing how the Numeric Mouse is held by a user's hand.

FIG. 5 is a perspective view of an alternate embodiment of the invention showing light pen being used in association with a computer screen.

SUMMARY

A one-hand, hand-controlled computer peripheral pointing device (Numeric Mouse) is provided having a numeric keypad array and optional means for dynamically controlling the value of data input. Specific applications of the dynamic control feature of the computer peripheral pointing device allow the user to simulate free hand drawing, sketching or painting where the width, color or other attribute of the line to be drawn, sketched or painted is changeable (variable).

In a principal embodiment the hand controlled computer peripheral pointing device is a numeric mouse which has disposed thereon a numeric keypad of twelve or more keys and preferably at least one finger operable button for use in controlling the dynamic value of the desired attribute of the inputted data. The button is adapted to operate in a digital (or "click" mode), and in an analog (or "depth" mode) Thus in the first, digital/click mode the mouse operates as a conventional point and click-type mouse pointing device. In the analog mode a user, by simply moving just one finger on the button may, for example, change the width of a line to be drawn or may change the color saturation according to the position (amount or depression) depth of the analog button which is being pressed by the finger. When the user is satisfied with that line width or color, he just clicks another digital key provided on the mouse to select (enter) that choice.

The numeric mouse is provided with a plurality of dedicated integer keys arranged in similar fashion as is found on a conventional keyboard so that numerical or digital information can be entered directly from the mouse to the computer system. In regard to this embodiment involving a numeric key pad, the minimum number of keys is twelve, the keys are dedicated to 0–9, plus entry and the decimal point, and the keys all contain means associated therewith, preferably on the surface of the keys, to identify the specific integer, the entry function, or the decimal point to which the key is dedicated. The dedicated integer keys may also represent dedicated function keys F1 through F10. This eliminates the necessity of moving the user's hand back and forth between a conventional mouse and the computer keyboard when inputting numerical data or using a command function key. This embodiment may optionally include an analog switch associated with one or more of the dedicated keys and/or with any of the additional commonly used keys provided thereon.

The numeric mouse, being a relative positioning device, also enables the user to point the mouse to a data box or other desired location on the computer screen and then key in numeric data. This "point and type" technique greatly reduces the problem that a user faces when unsure of the correct key sequence or keys needed to be typed or keyed in order to move the cursor to the next box.

The numeric mouse of this invention is ergonomically designed to comfortably fit the user's hand and, by having a conventionally numbered key pad display positioned thereon, allows a new user to quickly familiarize him or herself with the numeric mouse and maximize the potential of this pointing device Thus, the user is now provided with greater freedom by using one hand to type in a lot of numeric data and move the cursor around the computer screen as he or she desires.

Although the numeric mouse of this invention doesn't have a traditional "left button" or "right button", the traditional functions of the left and right button on conventional mouses are retained as they may conveniently be incorporated into and replaced by numeric keys. For example, the number four key can replace the left button, and the number six key can replace the right button on the numeric key pad of the mouse. Thus, the numeric key pad configuration of this invention adds value as well as a range of numerical input capabilities to conventional mouse pointing devices.

Depending on the software application to be used in conjunction with the mouse pointing device of this invention, mode selection is provided wherein the user can be in either a mouse pointing mode or data entry mode. Thus, where the software is written to distinguish between a "right button click" mode or a "digit six input" mode according to the item type that the mouse points to on the screen, the desired mode selection is effected.

In a second principal embodiment of the invention, a light pen is provided with a dynamically controllable depth-sensitive button so that a value may be added to the data input as the user desires, according to the amount of depth the button is depressed under direction of the user's finger. Thus, depending on the type of applications program used, the user may, by drawing either directly on the computer screen or the like, change the desired attribute of the line, such as line width, color intensity, etc.

Unlike currently available pressure sensitive light pens, the user is not required to apply pressure directly to the computer screen in order to effectuate a change in value to a given attribute. Thus the user of the pen of this invention avoids the possibility of inadvertently moving a computer screen or digitizing tablet in response to an unexpectedly greater exertion of pressure than anticipated.

Conventional pressure pens are limited to distinguish between successive value or pressure levels of force (typically 16-256 levels of force). The light pen of this invention, being depth sensitive and analog driven, and not step-wise and pressure sensitive, is able to distinguish between a greater range of value levels.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

A one-hand, hand-controlled computer peripheral pointing device constructed in accordance with the preferred best mode of the invention of the present invention is indicated generally by the reference numeral 1 in FIGS. 1-3.

The preferred embodiment resembles a typical "mouse" pointing device but with the addition of one or more buttons placed thereon, and is hereinafter referred to as "numeric mouse" or more simply, "mouse".

The numeric mouse 1 comprises a housing 15, a numeric keypad 10 and a cable 17 connecting the housing to a computer or computer system. The housing 15 is sized to fit comfortably in one of a user's hands. It has sufficient internal space to hold the circuitry and necessary mechanical parts required for relative positioning of the mouse as a pointing device. The relative positioning feature of the numeric mouse 10 can be achieved by use of a tracking ball, appropriate optical device or any other conventional means used to achieve relative positioning.

A numeric key pad 10 is located on a top surface 16 (divided into two parts, 16a and 16b) of the housing 15, and has a layout similar to a calculator keypad or to a computer keyboard's numeric keypad. By using a traditional numeric keypad in combination with a conventional looking mouse pointing device, most new users will immediately become familiar with the operation of the keypad functions.

While the preferred embodiment of the numeric mouse has numeric keypads disposed thereon, it is understood that the indicia, on the keypads may carry any form of symbolic information that is to be used with the application program selected by the user. For instance the function keys F1-F10 may be substituted in place of the numeric keys numbers 0-9. In this way, the numeric keypad having F functions in place of integers on each keypad is ideally suited to most word processing software programs which traditionally use F function keys for commands.

As shown in FIGS. 1 and 3, in addition to the keys numbered from 0-9, a decimal point key 31 and an enter key 32 are also provided. While the decimal point key 31 and the enter key 32 are disposed on laterally extending portions 18 of the housing 16 adjacent to the upper right and left corners of the numeric keypad layout 10, respectively, both keys may be positioned below the numeric keypad 10 as they are on most computer keyboards. However, in the preferred configuration shown, the user is less likely to inadvertently hit the enter key or decimal point key when another numeric key is intended. In addition, offsetting the two above mentioned keypads in the above described manner enhances the symmetrically balanced design of the keypad configuration on the numeric mouse 1.

Each of the keypads function as normal click type keypads as are commonly found on calculators or computer keyboards, with the exception of the "digit 4" key 24, which also has an analog mode incorporated therewith. The "digit 4" key 24 (hereinafter referred to as the "analog key") includes an analog switch which permits the user to input an integer value corresponding to the depth that the switch is pressed. One way of providing analog capability to this switch is by using a variable resistor which is controlled by the switch in combination with an analog-to-digital converter to receive the voltage which is measured across the variable resistor. When the software receives the current integer value generated from the activation of this switch, the software will be able to distinguish whether it means that a digit 4 is pressed (i.e., "clicked in") or whether the user is inputting a value to some attribute (i.e., by measuring the amount of depth that the analog key 24 has been depressed). This may be done by the software wherein the program checks the type of item that the mouse is pointing to on the computer screen before a decision to be in the "click" or "analog" mode is made.

In other words, the user may change the value of some attribute when using a special applications program by operating the "digit 4" analog key 24 in this manner. For example, when drawing a line using a CAD program the user may wish to change the width of the line that is being created upon moving across the screen. To do this, a user simply points the mouse where he or she wishes to begin and engages the analog mode by depressing the analog key 24. The user then moves the mouse in desired direction and alters the depth of the button according to the width of the line that he desires to draw. Similarly, in using a paint applications program, the user may change the color intensity of a brush stroke as he moves across the screen by altering the depth of the analog key 24. To maintain a constant value for a line width or brush stroke color the user merely hits the enter key 32 after the desired value is obtained.

The "digit 4" analog key 24 can be used in essentially the same manner as the left button of a regular mouse. That is, the point and click technique may be used with this key; the user moves a mouse and correspondingly points the cursor to a desired object on the screen and merely selects this object by depressing the analog key 24. The "digit 5" key 25 and "digit 6" key 26 may also be used as the center and right button keys, respectively, of a conventional mouse pointing device. As is the case for the "digit 4" analog key 24, software may be designed to distinguish the click function from the analog function of these two keys by checking the item type that the mouse is pointing to in order to determine whether these keys are to be used as input keys for digital input, or as the center and right "click" keys for a conventional mouse.

OPERATION OF THE NUMERIC MOUSE

As is best seen in FIG. 4, the user generally positions his or her hand over the numeric mouse in the position shown. For the case of a right-handed user, the index finger of the user's hand is positioned over the left vertical column of numbers 41 containing digit keys 7, 4 and 1. The user's middle finger is accordingly positioned over the middle column 42 of numbered keys 8, 5 and 2, while the user's third finger is positioned over the right column 43 of numbered keys 9, 6 and 3. For a left handed user, the reverse column-to-finger designation applies. Note, how conventional numeric keypads on keyboards are positioned on the right hand side of the keyboard. This tends to dictate to the user that the keypad is for the right hand, as it is awkward for a left handed user. The numeric mouse 1 of this invention does not distinguish between a right-handed or left-handed user as it is small and portable and can be used by either hand.

Note also how the two upper surface portions 16a and 16b of the housing 15 are sloped downward away from the raised center portion 18 (see also FIG. 2). This is one of many subtle ergonomic design considerations of the numeric mouse. By positioning the 0 key on surface 16b, i.e. on a plane distinct from plane 16a, the user's three key punching fingers are oriented more easily to the key pad without the need of the user to continuously keep an eye on where he pushes his fingers. Another ergonomic design consideration is the outwardly flaring portions 19 disposed on the bottom end of the housing (i.e. the end facing the mouse device user). These outwardly flaring portions 19 provide a point of grasping contact or abutment for the user's thumb and little finger when moving the numeric mouse 1 over the flat working surface where it is to be used. Additionally, the laterally extending portions 18 at the upper end of the housing 15 (i.e. the end adjacent the cable 17) also serve as physical sign posts to orient the user's three main fingers over the numeric keypad and the key-less area below the 0, 1, 2 and 3 keys on surface 16b (FIG. 2) functions as a palm rest area as shown in FIG. 4.

In operation, the user may use the numeric mouse 1 just as a conventional keyboard. That is, the current mouse position is ignored and the user may type numeric data into the computer directly on the numeric mouse rather than reverting back to the standard keyboard. This provides the user's hand with an extra degree of freedom when the user is inputting numeric data and using a mouse at the same time, since the user is not required to go back and forth between the two peripherals.

As described above, the numeric mouse 1 may also be used in its click mode just like conventional mouse pointing devices, wherein the "digit 4" key 24 is the click-type left key on a conventional numeric mouse, the "digit 5" key 25 is the center key and the "digit 6" key 26 is the right key on a conventional mouse.

As noted, software may be provided to discern whether the user desires to be in the "click" or analog mode depending on what the mouse is pointing to on the screen and what type of applications program is being run.

In the analog mode, the "digit 4" analog key 24 is depressed to control a value of an attribute, (for example, the width of a line in a CAD applications program), by simple operation of the user's index finger. The preferred way to change modes back to the click mode is software based, i.e., the mode depends on what the mouse is pointing to on the screen.

The numeric mouse may also be used in the point and click mode to enter data onto the screen by first pointing the mouse to a data box on the screen and then entering the numeric data from the numeric key pad 10. This allows the user to enter numeric data directly from the numeric mouse without having to go back to the key pad of the key board. Accordingly, the numeric mouse of this invention provides a new way to interface with the computer by permitting the user to dynamically change an attribute while the user is moving the mouse. This makes the numeric mouse equivalent to a real paint brush when using it as a graphic input device.

This mouse also greatly reduces the need for moving the hand back and forth between the mouse and computer key board. Accordingly, those graphic operating system based application programs for all which list all possible choices on the screen, the user simply clicks the choice without having to recall the spelling (name) of the item. Once an application program is implemented using this mouse, the user only needs to use the computer keyboard when he wants to add an new name into the set of choices, since he/she can key in numerical data directly from the numeric mouse. Moreover, in some real world applications, the operator does not need to have a computer key board any more, since he has no need to add in a new item.

ALTERNATE EMBODIMENT

In an alternate embodiment the hand-controlled computer peripheral pointing device is a light pen as shown in FIG. 5 The light pen 50 has disposed adjacent its writing end 51 an analog value control button 55 for imputing a value corresponding to the depression of the button 55. An example of how such a light pen 50 may be used would be in a CAD operation where the user may desire to change the width of a line as he is drawing directly on the screen 65 of a computer 60. To increase the width of a line, the user merely further depresses the analog value control button as he or she draws.

It should be understood that various modifications within the scope of this invention can be made by one of ordinary skill in the art without departing from the spirit thereof.

Although the description above contains specific examples these should not be construed as limiting the scope of the invention, but as merely providing illustrations of some of the presently preferred embodiments of this invention. For example, as shown in the first alternate embodiment, the analog switch could be put on a light pen, which is also a traditional pointing device. The number of analog switches is not limited to one. Further embodiments may use one or more analog switches. Moreover, with regard to the mouse embodiment, the analog switch does not need to be associated solely with the "digit 4" key. The layout of the key pad could also be different. Most frequently used keys may also be included in the key pad as long as this pointing device remains easy to use and can be operated by hand. Described above are a variety of ways to change modes between analog and click: software discrimination (checking the item type the mouse points to), current integer value of the analog switch (full depression equals click), or pressing a combination of keys. Any other equivalent apparatus or methods can be employed, e.g., additional keys, arrangement of keys, or designation of keys.

I therefore wish my invention to be defined in view of the specification as broadly as the prior art will permit.

I claim:

1. A one hand controllable computer peripheral pointing device for selecting and controlling a portion of a computer screen display and for input to a mouse-based computer program comprising in operative combination:
   (a) a housing, said housing being:
      (i) sized to enclose means for on-screen pointing functioning of said pointing device; and (ii) adapted to be held by one hand;

(b) said housing having at least one first surface;

(c) at least one finger-actuable button disposed on said first surface, each of said finger-actuable button being positioned on said pointing device for convenient and efficient actuation by one or more fingers of one of a user's hands while said pointing device is being controlled by said hand; and (d) an analog switch, disposed in association with at least a first one of said finger-actuable buttons, said analog switch and associated finger-actuable button having dual function mode capability including:

(i) a first function mode for use as a selection mechanism; and (ii) a second function mode for inputting to a computer a signal corresponding to the depth that said button is directly actuated by fingers of said user's one hand to dynamically control the value of an attribute of input data represented on a computer screen display.

2. A one hand controllable computer peripheral pointing device as in claim 1 wherein:

(a) said pointing device is a relative positioning device including a plurality of buttons;

(b) said relative positioning device having at least two modes of operation including a first digital mode and a second analog mode wherein:

(i) each of said buttons has on/off, click states during operation in said digital mode, and (ii) at least said first button is a dynamically controllable button associated with said analog switch during operation in said analog mode.

3. A one hand controllable computer peripheral pointing device as in claim 2 wherein said relative positioning device includes means for switching back and forth between said digital mode and said analog mode.

4. A one hand controllable computer peripheral pointing device as in claim 3 wherein:

(a) said plurality of buttons includes a numeric keypad array to permit input of numeric data.

5. A one hand controllable computer peripheral pointing device as in claim 4 wherein:

(a) said relative positioning device is a mouse; and (b) a cable connected to said mouse, said cable transmitting signals to said computer in response to actuation of each of said buttons or relative movement of said pointing device.

6. A one hand controllable computer peripheral pointing device as in claim 3 wherein:

(a) said plurality of buttons includes a function-key keypad array to permit keying a command.

7. A one hand controllable computer peripheral pointing device as in claim 6 wherein:

(a) said relative positioning device is a mouse; and (b) a cable connected to said mouse, said cable transmitting signals to said computer in response to actuation of each of said buttons or relative movement of said pointing device.

8. A one hand controllable computer peripheral pointing device as in claim 1 wherein:

(a) said pointing device is a light pen;

(b) said housing comprises a hand graspable barrel having a first end defining a pen tip;

(c) said first button being disposed on said barrel in finger-use position.

9. A one hand controllable computer peripheral pointing device as in claim 8 which includes:

(a) a cable connected to said light pen, said cable transmitting signals to said computer in response to actuation of each of said buttons or relative movement of said pointing device.

10. A one hand controllable computer peripheral pointing device as in claim 8 wherein:

(a) said first button is disposed adjacent said pen tip for convenient actuation by a user's finger while said light pen is held in a writing position.

11. A one hand controllable computer peripheral pointing device as in claim 4 wherein:

(a) said numeric keypad array is

| 7 | 8 | 9 | |
|---|---|---|---|
| 4 | 5 | 6 | |
| 1 | 2 | 3 | ;and |

(b) said plurality of buttons further includes a 0 key disposed below the 1,2,3 key row.

12. A one hand controllable computer peripheral pointing device as in claim 11 wherein:

(a) an enter key is provided substantially adjacent one of the upper numeric key rows of said numeric keypad array;

(b) a decimal point key is provided adjacent one of said upper numeric rows opposite to said enter key.

13. A one hand controllable computer peripheral pointing device as in claim 12 wherein:

(a) said first dynamically controllable button is the number 4 key.

14. A one hand controllable computer peripheral pointing device as in claim 13 wherein:

(a) said key array includes keys having left, center and right key functions.

15. A one hand controllable computer peripheral pointing device as in claim 14 wherein:

(a) said left function key is the number 4 key;

(b) said center function key is the number 5 key; and (c) said right function key is the number 6 key.

16. A one hand controllable computer peripheral pointing device as in claim 15 wherein:

(a) said relative positioning device is a mouse; and (b) a cable connected to said mouse, said cable transmitting signals to said computer in response to actuation of each of said buttons or relative movement of said pointing device.

17. Method of dynamically controlling an attribute of data input to a mouse-based computer program by actuation of a finger-actuable key on a peripheral pointing device, comprising the steps of:

(a) providing an analog switch in association with said key;

(b) providing variable depth of actuation of said key by finger motion; and (c) varying the output of said key in relation to the depth of finger actuation to control or select the attribute of data input in a computer;

(d) providing said key with dual function mode operational capability including a first, analog data attribute mode and a second digital click selection mode; and (e) providing means for distinguishing between said modes of said peripheral pointing device key in accordance with software written in said mouse-based program.

18. Method of dynamically controlling an attribute of data input to a computer by actuation of a finger-actuable key as in claim 17 wherein:
(a) said key is provided in association with a relative positioning device; and
(b) said step of key actuation may include simultaneously moving said relative positioning device.

19. Method of dynamically controlling an attribute of data input to a computer by actuation of a finger-actuable key as in claim 17 wherein:
(a) said key is provided on a light pen; and
(b) said step of key actuation may include simultaneously moving said light pen.

20. A one hand controllable mouse-type computer peripheral pointing device for selecting and controlling a portion of a computer screen display and for input to mouse-based computer applications programs comprising in operative combination:
(a) a mouse having a housing sized and configured to be held and manipulated by one hand of a user;
(b) said mouse housing having a first upper surface, which surface has a first finger end and a second heel end;
(c) said mouse housing enclosing means for relative positioning on-screen pointing functions of said device;
(d) twelve dedicated keys disposed projecting from said mouse first upper surface;
(e) said twelve dedicated keys including ten numeric keys 0 through 9;
  (i) keys 1 through 9 of said ten numeric keys are disposed in the following array:

| 7 | 8 | 9 |
|---|---|---|
| 4 | 5 | 6 |
| 1 | 2 | 3 |

(ii) said 7, 8, 9 key row being disposed adjacent said finger end of said first surface;
  (iii) said 4, 5, 6 key row being disposed medial of said finger and said heel ends of said first surface;
  (iv) said 1, 2, 3 key row being disposed medial of said 4, 5, 6 key row and said heel end of said first surface;
  (v) said zero key is disposed medial of said 1, 2, 3 key row and said heel end of said first surface;
(f) an enter key disposed substantially adjacent one of said key rows;
(g) a decimal point key disposed adjacent one of said key rows;
(h) means for identifying said enter key and said decimal point keys with their respective function, and for identifying each of said ten numeric keys with a particular character of a ten character numeric character set, each character associated with its unique dedicated numeric function, said identifying means permitting single keystroke input of numeric data for numerical data input programs and single keystroke selection of alphanumeric data for data presented in a tabulated format on said computer screen display.

21. A one hand controllable computer peripheral pointing device as in claim 20 wherein:
(a) at least one of said plurality of keys is an analog key having means for inputting to said computer a signal corresponding to the depth that said key is depressed to dynamically control the value of an attribute of an input represented on said computer screen display.

22. A one hand controllable computer peripheral pointing device as in claim 21 wherein:
(a) said analog key is one of said dedicated numeric keys.

23. A one hand controllable computer peripheral pointing device as in claim 22 wherein:
(a) said analog key is the number 4 key.

24. A one hand controllable computer peripheral pointing device as in claim 20 wherein:
(a) said key array includes keys having left, center and right key functions.

25. A one hand controllable computer peripheral pointing device as in claim 24 wherein:
(a) said left function key is the number 4 key;
(b) said center function key is the number 5 key; and
(c) said right function key is the number 6 key.

26. A one hand controllable computer peripheral pointing device as in claim 25 wherein:
(a) at least one of said plurality of keys is an analog key having means for inputting to said computer a signal corresponding to the depth that said key is depressed to dynamically control the value of an attribute of an input represented on said computer screen display.

27. A one hand controllable computer peripheral pointing device as in claim 26 wherein:
(a) said analog key is one of said dedicated numeric keys.

* * * * *

UNITED STATES PATENT AND TRADEMARK OFFICE
CERTIFICATE OF CORRECTION

PATENT NO. : 5,063,376
DATED : November 5, 1991
INVENTOR(S) : Ronald G. Chang

It is certified that error appears in the above-identified patent and that said Letters Patent is hereby corrected as shown below:

On the title page of the patent, left hand column, in the field description for "[76] Inventor: ", that portion of inventor's address reading "1124 Wonderlich" should read -- 1120 Wunderlich --.

Signed and Sealed this

Second Day of March, 1993

Attest:

STEPHEN G. KUNIN

*Attesting Officer*   Acting Commissioner of Patents and Trademarks